United States Patent [19] [11] Patent Number: 5,398,792
Teraoka [45] Date of Patent: * Mar. 21, 1995

[54] CLUTCH DEVICE

[75] Inventor: Masao Teraoka, Tochigi, Japan

[73] Assignee: Tochigi Fuji Sangyo Kabushiki Kaisha, Japan

[*] Notice: The portion of the term of this patent subsequent to Jan. 28, 2009 has been disclaimed.

[21] Appl. No.: 261,804

[22] Filed: Jun. 16, 1994

Related U.S. Application Data

[63] Continuation of Ser. No. 15,067, Feb. 8, 1993, abandoned, which is a continuation of Ser. No. 736,656, Jul. 26, 1991, abandoned.

[30] Foreign Application Priority Data

Jul. 27, 1990 [JP] Japan .................. 2-197648

[51] Int. Cl.$^6$ .................. F16D 27/08; F16D 27/10
[52] U.S. Cl. .................. 192/48.2; 192/35; 192/48.5; 192/48.9; 192/84 AA; 180/248
[58] Field of Search .............. 192/48.2, 48.5, 48.9, 192/35, 84 A, 84 AA, 70.28; 180/248, 249, 250; 188/267

[56] References Cited

U.S. PATENT DOCUMENTS

| | | | |
|---|---|---|---|
| 2,861,225 | 11/1958 | Mergen | 192/35 X |
| 2,887,200 | 5/1959 | Mergen et al. | 192/35 |
| 2,933,171 | 4/1960 | Kraeplin | 192/35 |
| 2,937,729 | 5/1960 | Sperr, Jr. | 192/35 X |
| 2,947,393 | 8/1960 | Grover | 192/35 X |
| 2,947,394 | 8/1960 | Grover | 192/35 X |
| 3,138,232 | 6/1964 | Gerber et al. | 192/48.2 |
| 4,645,049 | 2/1987 | Matsuda et al. | 192/35 |
| 4,664,242 | 5/1987 | Downs | 192/70.28 X |
| 4,718,303 | 1/1988 | Fogelberg | 74/710.5 |
| 4,966,265 | 10/1990 | Wiese et al. | 192/48.2 X |
| 5,007,498 | 4/1991 | Wiese et al. | 192/35 X |
| 5,083,986 | 1/1992 | Teroaka et al. | 475/86 |
| 5,156,247 | 10/1992 | Wiese et al. | 192/48.2 |
| 5,172,798 | 12/1992 | Mabee | 192/48.2 X |

FOREIGN PATENT DOCUMENTS 2209879  9/1972  Germany .
62-48625  10/1987  Japan .

Primary Examiner—Charles A. Marmor
Assistant Examiner—Andrea Pitts
Attorney, Agent, or Firm—Graham & James

[57] ABSTRACT

A clutch device for controlling transmitted torque in a vehicle comprises a first friction clutch including multiple clutch disks, a hub, a clutch drum and a pressing ring; a second friction clutch including multiple clutch disks, a clutch drum, a cam ring and an electromagnet; a cam mechanism; and a spring. A part of the thrust force is cancelled by energizing force of the spring to shift an operating point of the first friction clutch to a high torque side. A range where only the second friction clutch operates becomes wider. Therefore, change in the torque of the second friction clutch relative to change in operating force is decreased. This contributes to an accurate torque control. In accordance with the function of this clutch device, features of front wheel drive and 4WD vehicles are obtained so that fuel consumption can be decreased and road ability can be improved. Further, straight running performance of a vehicle can be achieved and a tight corner braking phenomenon can be avoided.

9 Claims, 3 Drawing Sheets

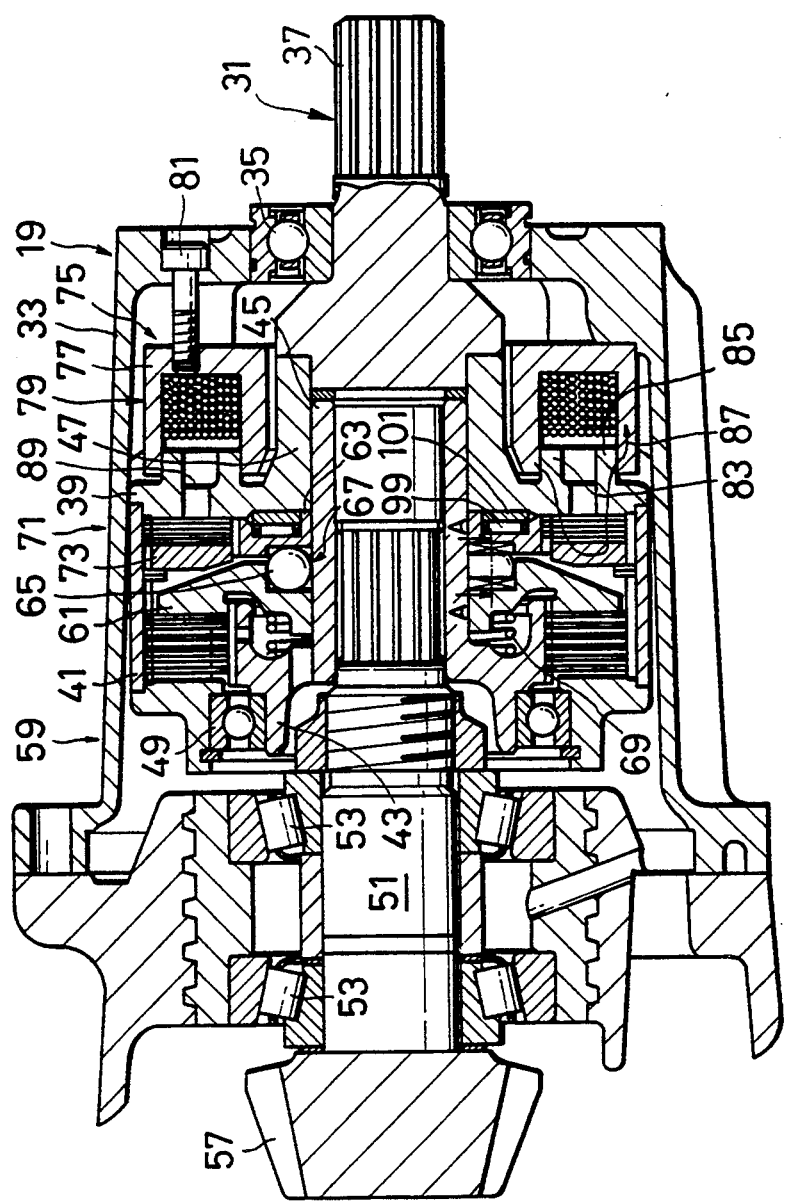
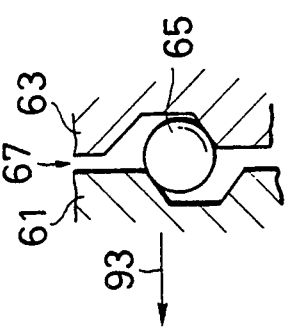
FIG. 1(a)
FIG. 1(b)

CLUTCH DEVICE

This is a continuation of application Ser. No. 08/015,067, filed on Feb. 8, 1993, now abandoned, which is a file wrapper continuation application of Ser. No. 07/736,656, filed Jul. 26, 1991, now abandoned.

BACKGROUND OF THE INVENTION

The present invention relates to a clutch device for vehicles and more particularly to a clutch device adapted to control torque transmitted between the shaft of a front wheel side and the shaft of a rear wheel side for a four wheel drive vehicle.

Japanese examined patent publication 62-48625 discloses "an electronic type four wheel drive controller". This is a device adapted to decrease internally circulating torque transmitted through each propeller shaft of front wheels and rear wheels during driving of a vehicle by controlling the torque of a clutch as a power transmission which employs an electromagnet. In accordance with this device, however, the magnitude of transmitted torque depends on magnetic force generated from the electromagnet and the number of clutch disks. High electromagnetic force is, therefore, required in order to transmit great torque.

SUMMARY OF THE INVENTION

It is an object of the present invention to remove such a problem by providing a clutch device which may enable great torque to be transmitted through low electromagnetic force.

Another object of the present invention is to provide a clutch device, wherein an accurate torque control can be effected within a low torque region.

These and other objects can be achieved according to the present invention by providing a clutch device for controlling torque transmitted between a front wheel drive shaft and a rear wheel drive shaft of a four wheel drive vehicle comprising: a first friction clutch including a hub connected to one shaft so as to be rotatable integrally therewith, multiple clutch disks retained by the hub, multiple clutch disks respectively disposed alternately with the multiple clutch disks, a clutch drum retaining these clutch disks, a pressing ring for pressing and connecting these clutch disks together, the pressing ring being retained by the hub so as to be axially slidable and to be rotatable integrally therewith; a second friction clutch including a clutch drum connected to the other shaft so as to be rotatable integrally therewith and with the clutch drum, multiple clutch disks retained by this clutch drum, multiple clutch disks respectively disposed alternately with the respective multiple clutch disks, a cam ring for retaining these clutch disks and an electromagnet for connecting these clutch disks together; means for generating thrust force by receiving torque transmitted from the cam ring when the clutch disks of the second friction clutch are connected together, axially moving the pressing ring by the thrust force and connecting the clutch disks of the first friction clutch; and means for energizing the pressing ring against the thrust force to decrease th connecting force of the first friction clutch.

BRIEF DESCRIPTION OF THE DRAWINGS

FIGS. 1(a) and 1(b) show an embodiment of the present invention;

FIG. 1(a) is a sectional view of a clutch device of the present invention;

FIG. 1(b) is a sectional view taken along a line A—A in FIG. 1(a);

DESCRIPTION OF THE PREFERRED EMBODIMENT

Figure 2:
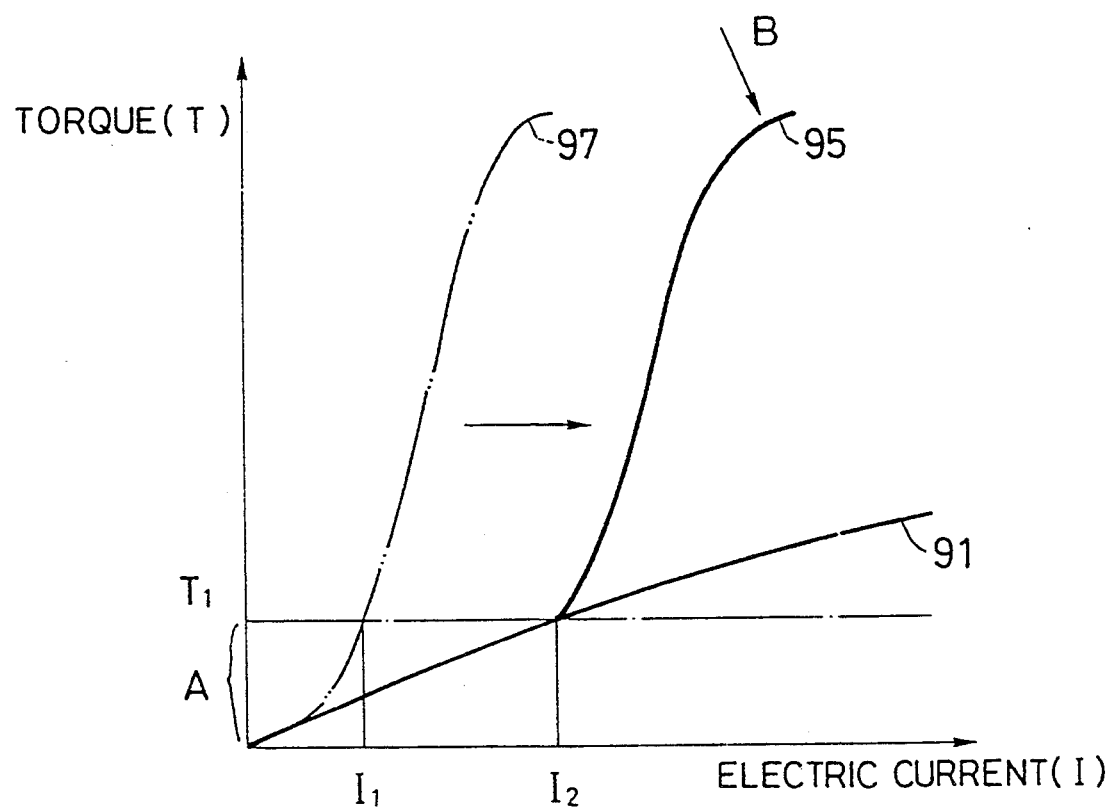
FIG. 2 is a graph showing a feature of this embodiment.

Making reference to FIGS. 1(a) to 3 an embodiment of a clutch device of the present invention will be described. FIGS. 1(a) and 1(b) show the clutch device of this embodiment. FIG. 3 illustrates a power system of a four wheel drive (referred to as 4 WD, hereinafter) vehicle employing this clutch device. A direction from the left to the right side in FIG. 3 indicates that of the vehicle. The right part in FIG. 1 corresponds to the front portion (upper portion in FIG. 3) of this vehicle. Members affixed with no reference numeral are not illustrated in the drawings.

Referring to FIG. 3, a power system comprises an engine 1, a transmission 3, a front differential gear 5 (differential gear of a front wheel side), front wheel shafts 7 and 9, right and left front wheels 11 and 13, a transfer 15, a propeller shaft 17, a clutch device 19 of this embodiment, a rear differential gear 21 (differential gear of a rear wheel side), rear wheel shafts 23 and 25, right and left rear wheels 27 and 29 or the like.

In the clutch device 19 shown in FIG. 1(a), a connecting rod 31 is passed through the front end portion of a carrier 33 which accommodates the rear differential gear 21 and is supported through bearings 35 by the carrier 33. This connecting rod 31 is connected to the propeller shaft 17 side by a spline portion 37. The propeller shaft 17 is connected to the engine 1 side through the transfer 15 and the front differential gear 5. The connecting rod 31 is thus driven and rotated by driving force transmitted from the engine 1.

A flange portion 39 is formed at the rear end of the connecting rod 31. A clutch drum 41 is disposed integrally with the flange portion 39. A hub 43 having a boss portion 45 is provided in the inside of the clutch drum 41. The hub 43 with the boss portion 45 is rotatably supported by the supporting portion 47 of the flange portion 39 and a bearing 49.

A drive pinion shaft 51 is connected through a spline to the boss portion 45 of the hub 43. The shaft 51 is supported by the carrier 33 through bearings 53 and 53. A drive pinion gear 57 engaging with a ring gear 55 of the rear differential gear 21 is formed integrally at the rear end of the shaft 51.

A multiple disk type main clutch 59 (first friction clutch) is arranged between the clutch drum 41 and the hub 43 to connect them. A pressing or pressure ring 61 for the main clutch 59 is disposed at the front side of the main clutch 59. The pressing ring 61 is connected to the boss portion 45 of the hub 43 through a spline so as to be movable forward and backward along the boss portion 45. A ball 65 is interposed between the pressing ring 61 and a cam ring 63 rotatably disposed at a front portion thereof, as illustrated in FIG. 1(b). The pressing ring 61, the cam ring 63 and the ball 65 constitute a cam mechanism 67.

A spring 69 (energizing member) is disposed between the hub 43 and the pressing ring 61. The spring 69 serves to urge the pressing ring 61 to the right in the figure and to energize the main clutch 59 to be opened.

A multiple disk type pilot clutch 71 (second friction clutch) is arranged between the cam ring 63 and the clutch drum 41 to connect them. At a rear side of the pilot clutch 71 is disposed an armature 73 so as to be movable forward and backward.

A ring shaped electromagnet 75 is arranged at a front portion of the flange portion 39 of the clutch drum 41. The electromagnet 75 comprises a yoke 77 and an electromagnetic coil 79. The yoke 77 is fixed to the carrier 33 by means of a bolt 81.

An air gap is formed between protrusions 83 and 85 of the flange portion 39 and the yoke 77 so as to permit a line of magnetic force 87 of the electromagnet 75 to pass. A ring 89 made of non-magnetic material is embedded in the flange portion 39. This ring 89 serves to prevent the short-circuit of the line of magnetic force and guide it to the armature 73.

When the armature 73 is attracted by the electromagnet 75, the pilot clutch 71 is pressed by the force of intensity which meets the attracting force of the electromagnet 75. Thus, the multiple disks of the pilot clutch 71 are connected with one another. As a result, the connecting rod 31 side (front wheel side) is connected to the drive pinion shaft 51 side (rear wheel side) through the clutch 71, the cam mechanism 67, the pressing ring 61 and the hub 43. The feature of torque of the multiple disk type pilot clutch 71 connected by the electromagnet 75 is represented by a graph 91 shown in FIG. 2.

Figure 3:
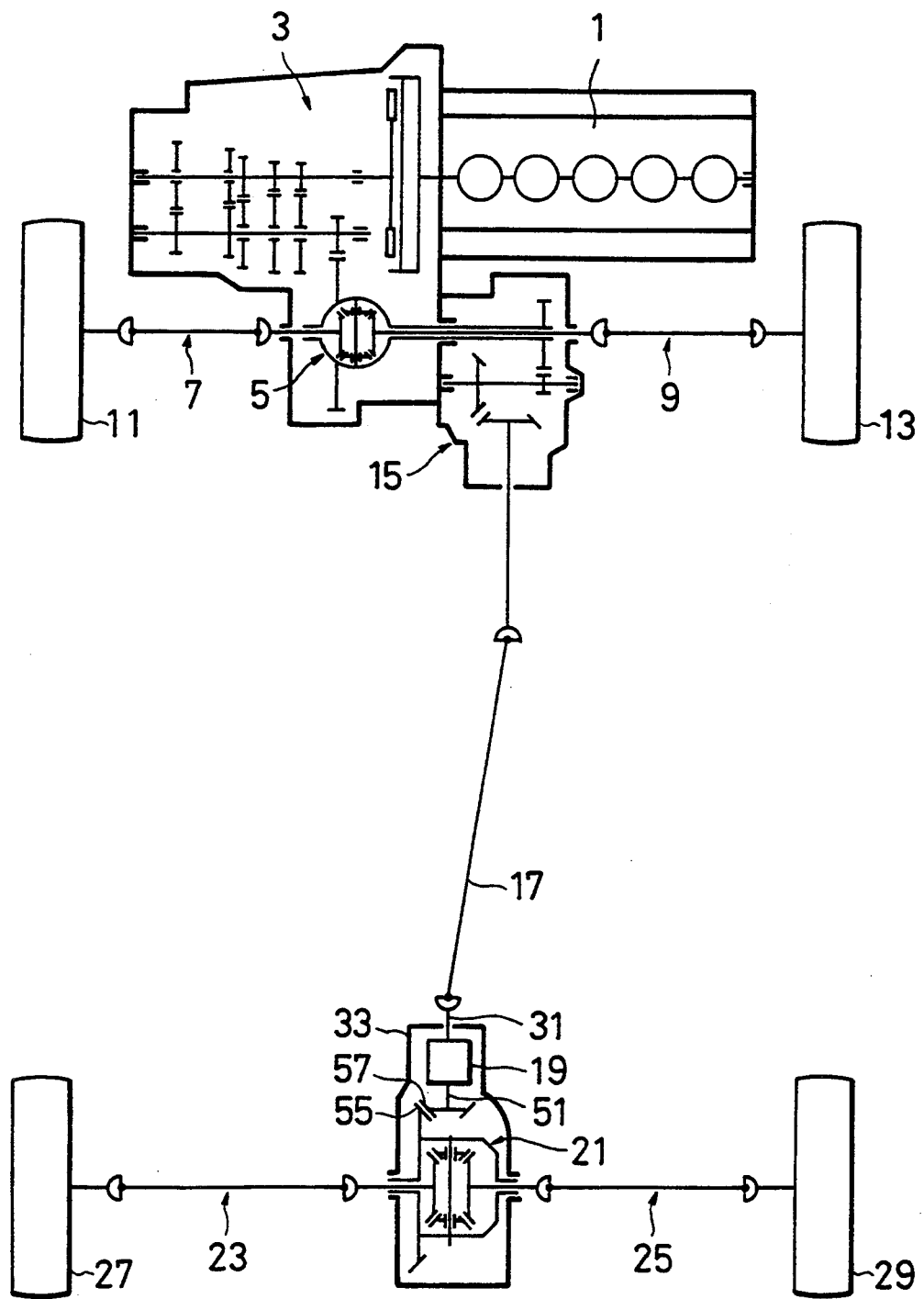
FIG. 3 is a skeleton organization chart showing a power system of a vehicle employing this embodiment.

In FIG. 2, when the transmitted torque is or lower than $T_1$ (low torque region), only the multiple clutch disks of the pilot clutch 71 are connected together, while those of the main clutch 59 are not connected together. In the low torque, therefore, the transmitted torque is controlled only by the pilot clutch 71.

When the clutch disks of the pilot clutch 71 are connected, the driving force of the engine 1 is exerted on the cam mechanism 67, so that backward thrust force 93 is generated. Then, when the transmitted torque exceeds $T_1$ (high torque region) and this thrust force 93 exceeds the energizing force of the spring 69, the multiple clutch disks of the main clutch 59 are pressed through the pressing ring 61 and connected together. While the thrust force 93 is weaker than the energizing force of the spring 69, the multiple disks of the main clutch 59 are not connected. The energizing force of the spring 69 is preset to balance with the thrust force 93 at the upper limit $T_1$ in the low torque region A shown in FIG. 2.

Consequently, the feature of torque as shown by a graph 95 in FIG. 2 can be obtained. When the spring 69 is not employed, the feature of torque is represented by a graph 97 shown by two dot chain lines. When a torque value is $T_1$, a current value of the electromagnet 75 reaches $I_1$, as apparent from the graph 97. As compared with the above, the current value of the electromagnet 75 increases to $I_2$ in case of the graph 95. Since only the pilot clutch 71 operates within this range, change in the torque relative to change in current decreases. An accurate torque control can be, therefore, achieved.

In other words, a part of the thrust force is cancelled by the energizing force of the spring (energizing means) to shift an operating point of the first friction clutch to a high torque region. A range where only the second friction clutch is actuated, therefore, becomes the wider. Accordingly, the change in torque relative to the change in the operating force of the second friction clutch becomes gentle enough to make an accurate torque control.

The respective reaction forces of the thrust force 93 and the energizing force of the spring 69 are input to the flange portion 39 through a bearing 99 and a thrust washer 101 and cancelled by the thrust force 93 and the energizing force of the spring 69 in the clutch drum 41. The abovementioned torque control through the electromagnet 75 is manually performed from a driver's seat or automatically operated in accordance with a condition of road surface or a steering condition of vehicle and so on.

The function of the clutch device 19 will be described in the following based on the power performance of the vehicle shown in FIG. 3.

The driving force of the engine 1 is distributed to the front wheels 11 and 13 through the front differential gear 5 from the transmission 3, while the driving force rotates the propeller shaft 17 through the transfer 15.

When the clutch device 19 is opened at that time, a transmission of the driving force to the rear wheels 27 and 29 is interrupted. The vehicle is put to a front wheel drive state, so that the feature of a front drive vehicle can be obtained and fuel consumption can be decreased.

When The clutch disks of the clutch device 19 are connected together, the driving force of the engine is transmitted to the rear wheel side through the clutch device 19. The vehicle is thus put to a 4 WD state. Even when a front wheel is, therefore, slipping on a road of adverse condition, a road ability of the vehicle can be maintained due to the driving force of the rear wheel side. The clutch device 19 whose clutch disks are connected is locked in the vicinity of an arrow B in FIG. 2. The stronger the connecting or coupling force of the clutch device 19 becomes, the higher the driving force of the rear wheel side becomes. The road ability of the vehicle is effectively improved and maximized at the locked state of the clutch device 19.

The stronger the connecting force of the clutch device 19 becomes, the more the differential limiting force between the front wheel side and the rear wheel side is increased. A straight running performance of the vehicle is thus improved and maximized in the locked state of the clutch device 19.

When adjusting the differential limiting force between the front wheel side and the rear wheel side through the clutch device 19 due to slip between the clutch disks of the pilot clutch 71, the differential rotation therebetween is allowed. Accordingly, the vehicle can be smoothly turned. Further, when the vehicle is driven to a garage or the like, a tight corner braking phenomenon can be prevented.

Even when the front wheels are locked upon a quick braking, the lock of the rear wheels resulting therefrom can be avoided by decreasing the connecting force of the clutch device 19 or opening the clutch device 19.

The control of these power performances is made in the low torque region A of the clutch device 19. Within this torque region, the accurate torque control as mentioned before is carried out.

Exemplary forms of the second friction clutch may include, for example, a clutch operated by an actuator or a clutch operated by converting torque of a motor into a cam thrust.

What is claimed is:

1. A clutch device for controlling a torque transmitted between a front wheel drive shaft and a rear wheel drive shaft of a four wheel drive vehicle, said clutch device comprising:

a first friction clutch including a hub connected to one of a pair of shafts so as to be rotatable therewith, first multiple clutch disks retained by the hub, second multiple clutch disks respectively disposed alternately with said first multiple clutch disks, a first clutch drum element retaining the first and second multiple clutch disks, a pressing ring for pressing and connecting the first and second multiple clutch disks together, said pressing ring being retained by said hub so as to be axially slidable and rotatable therewith, said first friction clutch being operable only in a high torque region of said clutch device;

a second friction clutch including a second clutch drum element connected to the other shaft so as to be rotatable therewith and with said second clutch drum element, third multiple clutch disks retained by said second clutch drum element, fourth multiple clutch disks respectively disposed alternately with said respective third multiple clutch disks, a cam ring for retaining the third and fourth multiple clutch disks, an armature disposed adjacent the third and fourth multiple clutch disks between the second clutch drum element and the cam ring, and an electromagnet for connecting the third and fourth multiple clutch disks together, wherein the third and fourth multiple clutch disks are disposed directly on the line of the electromagnetic force between the electromagnet and the armature said second friction clutch being operable in both a low torque region and the high torque region of said clutch device;

means for generating a thrust force by receiving a torque transmitted from said cam ring when the third and fourth multiple clutch disks of the second friction clutch are connected together, axially moving said pressing ring by the thrust force and connecting the first and second clutch disks of said first friction clutch; and spring means for energizing said pressing ring against the thrust force to decrease the connecting force of said first friction clutch.

2. A clutch device according to claim 1 wherein said thrust force generating means includes a cam mechanism consisting of a part of said pressing ring, a part of said cam ring and a ball disposed between the pressing ring and the cam ring.

3. A clutch device according to claim 1 wherein said energizing means includes a spring member.

4. A clutch device according to claim 1, wherein said first and second clutch drum elements cooperate with each other to form a single integral clutch drum.

5. A clutch device for controlling a torque transmitted between a front wheel drive shaft and a rear wheel drive shaft of a four wheel drive vehicle, said clutch device comprising:

a first friction clutch including a hub connected to one of a pair of shafts so as to be rotatable therewith, first multiple clutch disks retained by the hub, second multiple clutch disks respectively disposed alternately with said first multiple clutch disks, a first clutch drum element retaining the first and second multiple clutch disks, a pressing ring for pressing and joining the first and second multiple clutch disks together, said pressing ring being retained by said hub so as to be axially slidable and to be rotatable therewith, said first friction clutch being operable only in a high torque region of said clutch device;

a second friction clutch including a second clutch drum element connected to the other shaft so as to be rotatable therewith and forming a single integral clutch drum with said second clutch drum element, third multiple clutch disks retained by said second clutch drum element, fourth multiple clutch disks respectively disposed alternately with said respective third multiple clutch disks, a cam ring for retaining the third and fourth multiple clutch disks, an armature disposed adjacent the third and fourth multiple clutch disks between the second clutch drum element and the cam ring and an electromagnet for joining said third and fourth multiple clutch disks together wherein the third and fourth multiple clutch disks are directly on the line of the electromagnetic force between the electromagnet and the armature, said second clutch drum element having a side wall connected to the other shaft, said side wall being disposed between the third and fourth multiple clutch disks and said electromagnet so as to receive a pressing force of said armature to join said third and fourth multiple clutch disks, said second friction clutch being operable in both a low torque region and the high torque region of said clutch device;

a cam mechanism generating a thrust force by receiving a torque transmitted from said cam ring when the third and fourth clutch disks of the second friction clutch are joined together, axially moving said pressing ring by the thrust force and joining the first and second clutch disks of said first friction clutch; and a compression spring for pressing said pressing ring against the thrust force to decrease the connecting force of said first friction clutch, wherein said compression spring has an elasticity which is balanced with the thrust force generated by said cam mechanism in response to a predetermined transmitted torque.

6. A clutch device according to claim 5, wherein said cam mechanism includes a part of said pressing ring, a part of said cam ring and a ball disposed between said pressing ring and said cam ring.

7. A clutch device for controlling a torque transmitted to a front wheel drive shaft and a rear wheel drive shaft of a four wheel drive vehicle, said clutch device comprising:

a housing rotatably supporting a first shaft and a second shaft;

a clutch drum connected to the first shaft, having a first side wall and a second side wall;

a hub connected to the second shaft;

an electromagnet secured to said housing;

a first clutch including first multiple clutch disks retained by said clutch drum, second multiple clutch disks respectively disposed alternately with said first multiple clutch disks and retained by said hub, and a pressing ring retained by said hub so as to be axially slidable and to be rotatable therewith, said first clutch transmitting the torque to said clutch drum and said hub by pressing and joining said first and second multiple clutch disks together between said first side wall of said clutch drum and said pressing ring, said first clutch being operable only in a high torque region of said clutch device;

a second clutch including a cam ring disposed on an outer periphery of said hub, third multiple clutch disks retained by said clutch drum, fourth multiple clutch disks respectively disposed alternately with said third multiple clutch disks and retained by said cam ring, an armature disposed on an outer periphery of said cam ring and retained by said cam ring so as to be axially slidable and to be rotatable therewith, said second clutch rotating said cam ring with said clutch drum together by pressing and joining said third and fourth multiple clutch disks together between said second side wall of said clutch drum and said armature which is attracted by said electromagnet, said second clutch being operable in both a low torque region and the high torque region of said clutch device;

a cam mechanism producing a thrust force to said pressing ring by joining said second clutch to rotate said cam ring relative to said pressing ring, said cam mechanism controlling a proportion of distribution of the torque between said clutch drum and said hub by controlling a joining force of said first clutch with controlling a thrust force to said pressure ring; and a compression spring pressing said pressing ring against the thrust force produced by said cam mechanism so as to offset some of the joining force of said first clutch, said compression spring disposed between said pressure ring and said hub.

8. A clutch device according to claim 7, wherein said cam mechanism includes a part of said pressing ring, a part of said cam ring and a ball disposed between said pressing ring and said cam ring.

9. A clutch device according to claim 7, wherein said compression spring has an elasticity which is balanced with the thrust force generated by said cam mechanism in response to a predetermined transmitted torque.

* * * * *